United States Patent

Weller

(10) Patent No.: US 9,527,138 B2
(45) Date of Patent: Dec. 27, 2016

(54) CLAMPING DEVICE

(71) Applicant: Hainbuch GmbH Spannende Technik, Marbach (DE)

(72) Inventor: Hans-Michael Weller, Affalterbach (DE)

(73) Assignee: Hainbuch GmbH Spannende Technik (DE)

( * ) Notice: Subject to any disclaimer, the term of this patent is extended or adjusted under 35 U.S.C. 154(b) by 734 days.

(21) Appl. No.: 13/793,697

(22) Filed: Mar. 11, 2013

(65) Prior Publication Data

US 2014/0203524 A1 Jul. 24, 2014

(30) Foreign Application Priority Data

Jan. 23, 2013 (DE) .................. 10 2013 201 071

(51) Int. Cl.
*B23B 31/16* (2006.01)
*B23B 31/40* (2006.01)
*B23B 31/20* (2006.01)

(52) U.S. Cl.
CPC .............. *B23B 31/16* (2013.01); *B23B 31/20* (2013.01); *B23B 31/40* (2013.01);
(Continued)

(58) Field of Classification Search
CPC .............. B23B 31/20; B23B 31/4006; B23B 2231/201; B23B 31/16; B23B 2231/2081; B23B 31/207; B23B 2231/20; B23B 2231/2005; B23B 31/40; Y10T 279/1037; Y10T 279/17743; Y10T 279/17307
See application file for complete search history.

(56) References Cited

U.S. PATENT DOCUMENTS 1,370,598 A * 3/1921 Lapointe .............. B23B 31/201
279/147
2,735,686 A * 2/1956 Cox .................... B23B 31/201
279/50
(Continued)

FOREIGN PATENT DOCUMENTS

DE 42 09 999 C2 9/1993
DE 198 53 525 A1 5/2000
(Continued)

OTHER PUBLICATIONS

European Search Report issued in connection with EP 14151461.

*Primary Examiner* — Eric A Gates
*Assistant Examiner* — Paul M Janeski
(74) *Attorney, Agent, or Firm* — Akerman LLP

(57) ABSTRACT

A clamping means in the type of an outer clamping means or an inner clamping means for fixed-clamping of work pieces, for the purpose of rotative processing. For achieving a radial displaceability of the clamping segments thereof, an inclined guide surface of a clamping sleeve or of a clamping mandrel with correspondingly inclined slide surfaces on the clamping segments are used. For the application of force into the clamping segments, at least one coupling element is provided on the housing or on the actuation member. The clamping element is axially fixed to the housing or to the actuation member and engages with at least one clamping segment axially in a form-fit manner in a coupling region between an in axial direction distal guide surface region of the guide surface and an in axial direction proximal guide surface region of the guide surface.

15 Claims, 6 Drawing Sheets

(52) U.S. Cl.
CPC ........ *B23B 31/4006* (2013.01); *B23B 31/207* (2013.01); *B23B 2231/201* (2013.01); *B23B 2231/2005* (2013.01); *B23B 2231/2081* (2013.01); *Y10T 279/1037* (2015.01); *Y10T 279/17307* (2015.01); *Y10T 279/17743* (2015.01)

(56) References Cited

U.S. PATENT DOCUMENTS

| | | | | |
|---|---|---|---|---|
| 3,095,205 | A * | 6/1963 | Farnsworth | B23B 31/16158 279/123 |
| 3,292,939 | A * | 12/1966 | Lorenz | B23B 31/201 279/50 |
| 3,802,713 | A * | 4/1974 | Levy | B23B 31/201 279/113 |
| 4,856,797 | A | 8/1989 | Rall | |
| 9,010,767 | B2 * | 4/2015 | Baumann | B23B 31/001 279/150 |
| 2015/0021864 | A1 * | 1/2015 | Mauch | B23B 31/201 279/43.1 |

FOREIGN PATENT DOCUMENTS

| | | |
|---|---|---|
| DE | 101 23 657 A1 | 11/2002 |
| DE | 102 34 603 B4 | 2/2004 |
| DE | 10 2004 011 727 A1 | 9/2005 |
| GB | 553 933 A | 6/1943 |
| JP | 61 159 110 U | 10/1986 |

* cited by examiner

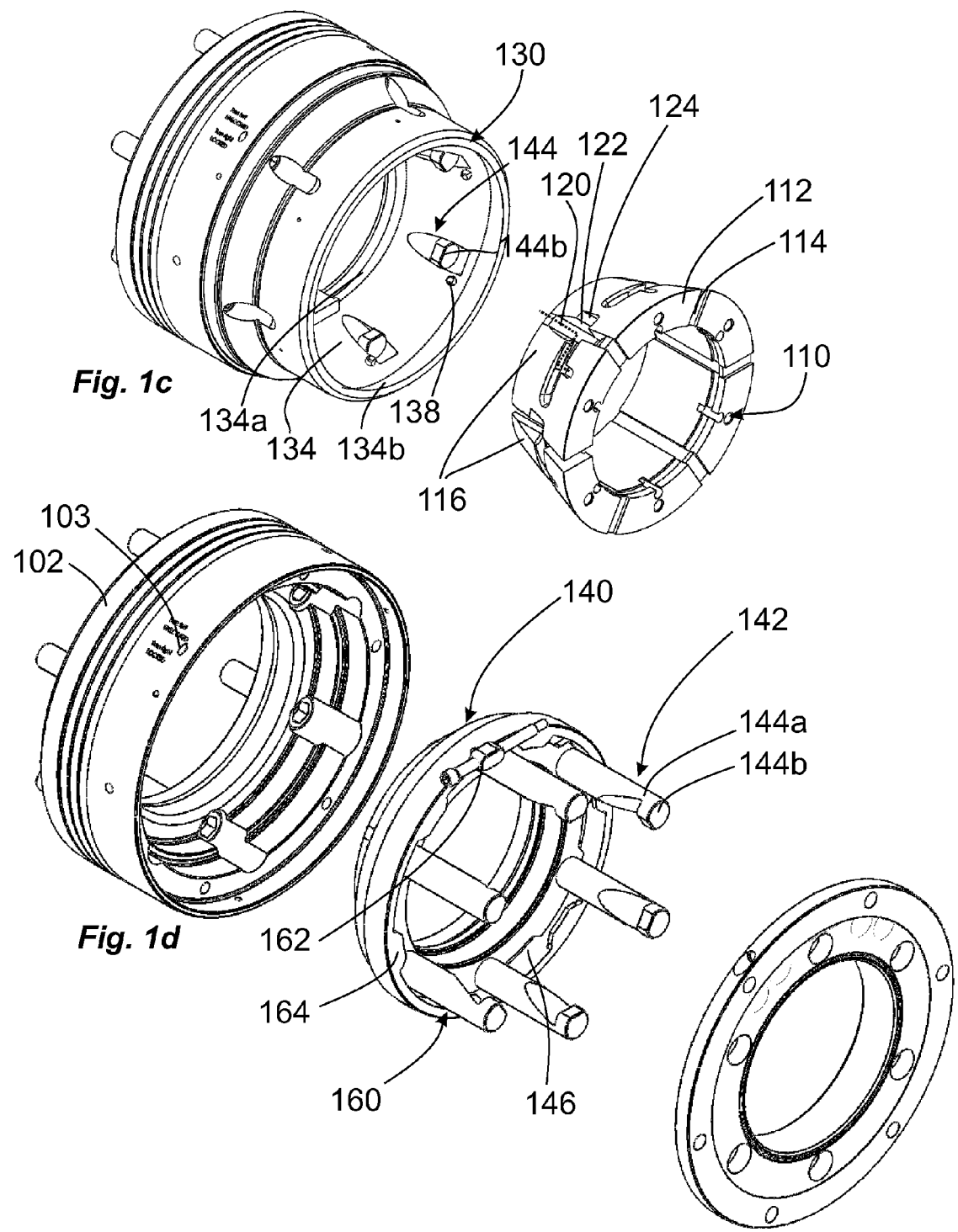

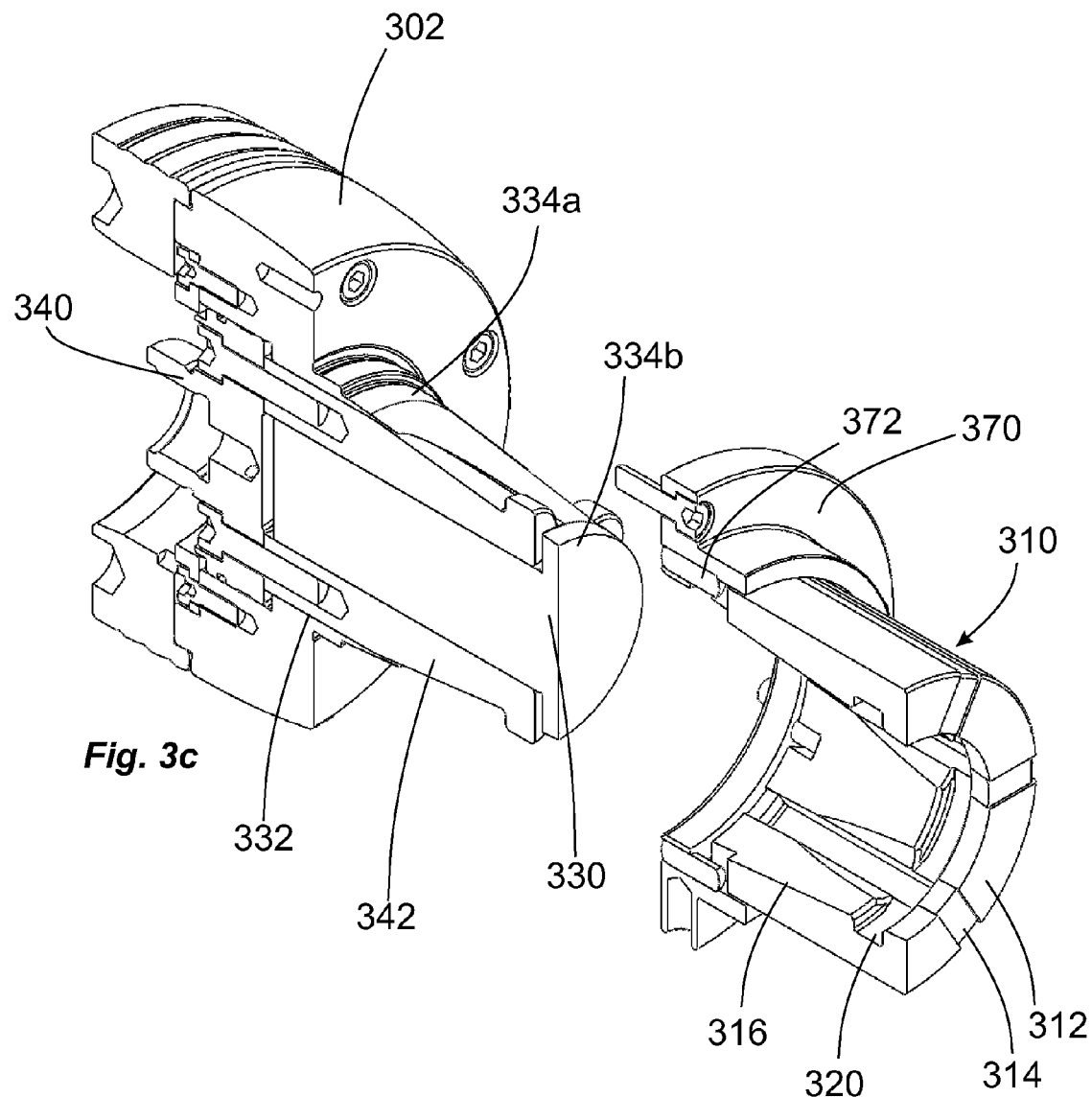

CLAMPING DEVICE

CROSS REFERENCE TO RELATED APPLICATIONS

This application claims priority to DE 102013 201 071.0, filed Jan. 23, 2013, the entire contents of which is hereby incorporated by reference.

FIELD OF APPLICATION AND PRIOR ART

The invention relates to a clamping means in the type of an outer clamping means or an inner clamping means for fixing of work pieces which is in particular provided for the purpose of rotating processing. To that end, such a clamping means includes, as the design may be for an outer clamping means or an inner clamping means, a housing extended along a central axis extending in the axial direction, wherein the central axis constitutes the rotational axis of the rotating housing in the case of a rotation clamping means. Furthermore, such a clamping means comprises an actuation member movable in relation to the housing in the axial direction for the purpose of clamping and de-clamping, a clamping sleeve or a clamping mandrel and a multitude of clamping segments which are arranged inside the clamping sleeve or outside the clamping mandrel and which serve for force application to the work piece.

Furthermore, in the case of an outer clamping means, the clamping sleeve comprises on its inner side a guide surface inclined in relation to the axial direction for each clamping segment. In the case of an inner clamping means, the clamping mandrel comprises on its outer side such a guide surface inclined in relation to the axial direction for each clamping segment. However, in this case, said respective guide surfaces of the clamping segments can be formed by a common, in particular conical guide surface.

Furthermore, correspondent thereto, the clamping segments in each case comprise on their outer side (in the case of an outer clamping means) or on their inner side (in the case of an inner clamping means) a slide surface accordingly inclined in relation to the axial direction. The clamping sleeve or the clamping mandrel on the one side and the entirety of the clamping segments on the other side can be relatively displaced in axial direction in relation to one another, in order to thereby achieve a radial displacement of the clamping segments in the case of axial relative displacement. For the purpose of achieving said axial relative movement, in the case of one possible configuration, the clamping sleeve or the clamping mandrel is attached axially fixed in location to the housing and the clamping segments are attached axially fixed in location to the actuation member. In a variant thereto, the clamping sleeve or the clamping mandrel are attached axially fixed in location to the actuation member and the clamping segments are attached axially fixed in location to the housing. Also possible is a configuration where the clamping mandrel or the clamping sleeve on the one side and the clamping segments on the other side can in each case be displaced in relation to the housing, wherein they are configured for displacement in opposing directions in relation to the housing by means of a transmission.

Clamping means of such type are generally known from the prior art. They serve for fixing of a work piece for the purpose of subsequent processing of said work piece, wherein this can be in particular a rotative processing where the work piece rotates about the rotational axis. This can in particular be a turning or lathe processing. For the purpose of clamping, clamping segments are provided which can be radially displaced by axial relative displacement of the guide surfaces on the side of the clamping sleeve or clamping mandrel and the slide surfaces on the side of the clamping segments sliding against one another. In the case of an outer clamping means, said clamping segments engage the work piece from outside. For example, this is appropriate for the processing of shafts. In the case of an inner clamping means, the clamping segments apply to the work piece by means of a radial outwards displacement. For this purpose, they are arranged in the vicinity of a hole or of another recess of the work piece.

Since in the case of a generic clamping means, the clamping segments need to comprise also a radial manoeuvrability with respect to the central axis/rotational axis besides their axial relative manoeuvrability in relation to the clamping sleeve or the clamping mandrel, they cannot be fixedly attached to the actuation member or to the housing of the clamping means. In order to achieve the desired fixing in location relative to the actuation member or relative to the housing, in the case of known clamping means it is common to provide a form-fit coupling location-tolerant with respect to the radial direction, for example between the common actuation member and all clamping segments.

In the case of known clamping means, said coupling is usually provided at the proximal ends of the clamping segments, wherein the terms "proximal" and "distal" are to be understood in the context of the present document such that from the perspective of the clamping means the proximal direction points in the direction of the machine tool and the distal direction points in the direction of the work piece clamped by the clamping means. Said coupling at the proximal end of the clamping segments leads to comparatively large dimensions of the clamping means in the axial direction. In addition, the coupling is in a region that is difficult to protect against intruding dirt so that there is a risk of soiling and of an operational disruption caused thereby.

OBJECT AND SOLUTION

The object of the invention is to further develop a generic clamping means to the effect that the risk of soiling in the coupling region between actuation member or housing on the one side and the clamping segments on the other side is reduced. Furthermore, it is an object of the invention to provide an axially short clamping means.

According to the invention, this is achieved in that for axially fixed in location coupling of the clamping segments to the housing or to the actuation member, at least one coupling element is provided which is provided axially fixed in location relative to the housing or to the actuation member and which in a coupling region between a guide surface region of the guide surface distally in axial direction and a guide surface region of the guide surface proximally in axial direction engages with at least one clamping segment axially in a form-fit manner.

To the components of a clamping means according to the invention, the following applies: A housing of a clamping means refers to a section of the same which is provided for axially fixed in location positioning in relation to the respective machine tool. Thus, during normal operation, the housing can merely be moved in a rotative manner in relation to the machine tool in the case of a clamping means provided for rotative processing. In the case of a clamping means for non-rotative processing, the housing is stationary in relation to the machine tool. The actuation member is a component preferably arranged within the housing which can be displaced axially in relation to the housing by means of the machine tool in order to allow de-clamping and clamping of the clamping means. The clamping sleeve is a component surrounding the clamping segments, which by means of its interaction with the clamping segments causes radial displacement of the latter. In the case of an inner clamping means, instead of a clamping sleeve a clamping mandrel is provided, which, apart from the difference that instead of being arranged outside the clamping segments it is arranged inside the latter, corresponds in respect of its function to the function of the clamping sleeve. Although it is generally considered to be appropriate that either the clamping segments or the clamping mandrel or the clamping sleeve are provided axially fixed in location to the housing and thus to the machine tool, configurations are conceivable in which the relative movement between the clamping sleeve or the clamping mandrel on the one side and the clamping segments on the other side is achieved in that both can be displaced in relation to the housing in opposite directions.

The multitude of clamping segments comprises at least two clamping segments. However, strongly preferred is a configuration having more than two clamping segments, in particular having three or more clamping segments. In particular configurations having four, six or eight clamping segments are appropriate in practice.

The clamping segments are preferably joined to a clamping segment ring in which the individual clamping segments are connected to one another by means of intermediate segments extendable in tangential direction. Thus, the clamping segments can be handled as unity.

The clamping sleeve or the clamping mandrel on the one side and the clamping segments on the other side comprise guide surfaces or slide surfaces which bear against one another when used and which are inclined in relation to the axial direction. Preferably, the axial direction includes an angle of less then 20° with the slide surfaces or the guide surfaces. The inclined position of the guide surfaces and of the slide surfaces has an effect that the relative movement of the guide surfaces in relation to the slide surfaces also effects a radial displacement of the clamping segments and thus a clamping or de-clamping. The guide surface and the slide surface can be in a permanent surface contact where to that end, in each case plane guide surfaces and slide surfaces are required. Instead, in practice, also guide surfaces and slide surfaces can be used which have the shape of a partial section of a cone surface. In the case of guide surfaces and slide surfaces shaped in said manner, a complete surface contact is not present in a permanent manner since the axial relative manoeuvrability is counteracting thereto. Indeed, in this case the gap width between the guide surfaces and the slide surfaces is very small during operation so that there is almost surface contact.

For the purpose of achieving the desired coupling in relation to an axial movement coupling between the clamping segments on the one side and the housing or the actuation member on the other side, the coupling elements provided according to the invention are provided, and preferably are bolts extending in the axial direction where at the distal end a contour is present which allows a form-fit coupling to the clamping segments. Said coupling elements, at least one thereof is preferably provided for each clamping segment, extend up to a coupling region in which the form-fit coupling to the clamping segments is obtained. As already explained, said coupling is such that a radial displacement of the clamping segments is still possible, although the coupling elements per se can preferably not be moved radially. Unlike the prior art, said coupling region is not provided at the proximal end of the clamping segments and thus on the proximal side of the guide surfaces, but with respect to the axial direction between a distal end of the guide surface and a proximal end of the guide surface. Thus, the guide surface at the clamping mandrel or the clamping sleeve extends in axial direction on both sides of the coupling region.

Thereby it is achieved that during operation a soiling of the coupling region can largely be prevented, since the latter is protected to both sides by the guide surfaces and slide surfaces directly or approximately bearing against one another at least in case of a completely installed clamping means. Since on the proximal side of the clamping segments, there is no need to provide any coupling mechanism on the clamping segments side, consequently a comparatively small design size in axial direction is possible for a clamping means according to the invention.

Besides the generally different clamping means in the type of an inner clamping means or an outer clamping means which are configured differing from one another for generating a clamping force acting radially outwards or acting radially inwards, clamping means according to the invention differ from one another by the type of relative manoeuvrability. In the case of a first configuration which just like a second configuration can be realized in both an inner clamping means and an outer clamping means, the clamping mandrel or the clamping sleeve cannot be moved in axial direction in relation to the housing. In contrast, the clamping segments are attached fixed in location to the actuation member with respect to the axial direction by means of the coupling elements, whereas a clearance acting in the axial direction is not compromising therein. The aforementioned fixing-in-location of the actuation member to the clamping segments refers to the conditions during clamping. Since in this configuration the clamping segments are axially and radially moved in relation to the housing for the purpose of clamping, there is also a displacement of the work piece in axial direction during the clamping. The second variant of the configuration of an inner clamping means or of an outer clamping means prevents this. In the case of said second configuration, the clamping segments are provided axially fixed in location to the housing while the radial manoeuvrability of the clamping segments is unaffected. In such a case, said radial movement is achieved in that the clamping mandrel or the clamping sleeve can be moved in relation to the housing, and to that end is attached to the actuation member. In the case of said second variant, the clamping segments move exclusively radially so that an axial displacement of the work piece during the clamping does not occur. Generally, beyond that, even a configuration is conceivable in which the clamping mandrel or the clamping sleeve on the one side and the clamping segments on the other side can be displaced with respect to one another in an opposing manner.

Generally it is possible to configure the guide surface of the clamping mandrel or of the clamping sleeve in a two-piece manner to the effect that the distal guide surface region or the proximal guide surface region are provided on two separate components which, however, during operation are always fixed in location with respect to one another. However, a configuration is of advantage in which the guide surface regions assigned to a clamping segment are part of an integral component. In particular, but not exclusively, in the case of such a one-piece configuration, it is considered to be advantageous if in the clamping mandrel or in the clamping sleeve at least one coupling channel closed over its circumference is provided through which the coupling element is guided from the housing or the actuation member up to the coupling region. In an advantageous manner, such a coupling channel is capable of representing a guidance for the coupling element and counteracts tilting. In this case, the coupling element and the coupling channel are preferably adapted to one another such that they form a narrow clearance fit. The clearance of the coupling element in relation to the coupling channel in the direction orthogonal to the axial direction is preferably less than 1 mm.

In a preferred configuration, at least one coupling element is provided for each clamping segment. Furthermore, preferably a distinct coupling channel is provided for each coupling element.

The coupling elements preferably configured in the type of a rod or a bolt preferably comprise on their distal end a narrowing or necking and an enlargement or widening subsequent to this in the distal direction for achieving the form-fit connection. In this case, a cross-section of the coupling element is particularly preferred not greater than the minimum free cross-section of the coupling channel, even in the region of the widening. In this context, a necking means that the coupling element comprises a region with a smaller cross-section between the actuation member or the end assigned to the housing and its opposite distal end, wherein said cross-section decrease in particular be present with respect to the distally widened end. Said distally widened end is provided to co-operate in a form-fit manner with the clamping segment assigned to it in order to effect the aforementioned axial coupling. In order to realise the engaging behind required therefor, the aforementioned necking is of advantage. By means of a configuration of the distal end to the effect that the latter does not exceed the cross-section of the coupling channel, a simple attachment facility is present where the coupling element is pushed through the coupling channel from the proximal side up into the coupling region. Thus, the hole for the coupling channel does not need to be configured such that the coupling element can be pushed-in from the guide surface.

For installation of the clamping segment ring, the latter needs to be brought into a form-engagement with the distal ends of the coupling elements. This is feasible in that the clamping segment ring can preferably be extended or compressed in order to achieve the form-fit coupling due to its elastic intermediate segments depending on the configuration of the clamping means as inner clamping means or as outer clamping means.

In order to facilitate the installation, however, it is of advantage if the entirety of the clamping segments is matched to the clamping mandrel or to the clamping sleeve such that an installation of the clamping segments on the clamping means is possible in the type of a bayonet connection. According to said further development, it is provided that an installation movement characterized by two relative movements is provided. At first, the clamping segments in a position twisted in relation to their operational state are pushed onto the clamping mandrel or pushed into the clamping sleeve in axial, proximal direction in order to be subject to rotation about a rotational axis/central axis identical to the axial direction. In this case it lends itself in particular to provide an installation rotation position in which the sections of the coupling elements provided for achieving the form-fit connection with respect to the circumferential direction are arranged in the vicinity of the intermediate segments. Thus, the region of the intermediate segments is used in the type of an axial groove in order to initially shift the clamping segments axially in the direction of their operational position.

In order to be able to subsequently realize the aforementioned rotation, an installation groove extended with respect to the axial direction and the circumferential direction is preferably provided on the slide surfaces of the clamping segments. Within said installation groove are the ends of the coupling elements responsible for the form-fit connection arranged during the installation rotation movement of the clamping segments. Despite the designation installation groove, it is preferably provided that said ends of the coupling elements remain in said groove also during operation, and that directly at this groove the application of force to the clamping segments from the coupling elements is effected. The installation groove preferably extends in an asymmetric manner from the intermediate segments of the clamping segment ring up to approximately half the slide surface of the clamping segments with respect to a circumferential direction so that by abutting of the ends of the coupling elements on the end of the installation grooves the technician can see that the rotational position desired for operation is reached.

In particular in the case of an inner clamping means it is considered to be advantageous if an exchange unit comprising the clamping segments is provided which in addition to the clamping segments also comprises a common circumferential handling ring connected to the clamping segments in a co-rotational manner. Said handling ring facilitates the handling of the clamping segments during the installation. It can additionally be used to secure the rotation position of the clamping segments in relation to the clamping mandrel or the clamping sleeve by screwing the handling ring in a predefined rotational position, for example to the housing.

As an additional or alternative rotation lock, provision is preferably made for that at least one rotation lock section is provided on the clamping sleeve extending radially inwards or on the clamping mandrel extending radially outwards which section is extended up to an axial groove extended primarily in the axial direction on the slide surface of at least one clamping segment in the installed state of the clamping segments. By means of such a rotation lock section, a rotation lock is provided directly between the clamping segment ring and the clamping sleeve or the clamping mandrel.

The clamping means is preferably configured to the effect that it can be switched between an operational state and an exchange state, the relative manoeuvrability of the actuation member and of the housing in the exchange state being greater than in the operational state. In this case, operational state refers to the state in which the clamping means is used, and thus includes both the clamped and the de-clamped state of the clamping means. The exchange state refers to a state in which the separation of the clamping segments from the clamping sleeve or the clamping mandrel is possible. By means of a enlarged relative manoeuvrability in the exchange state, the change can be facilitated or, depending on the configuration, even enabled at first. By means of the changeover facility of the clamping means between the exchange state and the operational state, it is at the same time ensured that the exchange option is not achieved unintentionally and leads to an unintentional detaching of the clamping segments from the clamping mandrel or the clamping sleeve. The enlarged relative manoeuvrability can for example be used to drive the coupling elements in relation to the clamping sleeve or the clamping mandrel further than during the operational state in the distal direction so that then for separating the clamping segments from the clamping mandrel or the clamping sleeve, a lesser degree of deformation of the clamping segment ring is required. In the context of the aforementioned bayonet system, however, it is of particular advantage when the increased relative manoeuvrability in the exchange state is used to the effect that not earlier than in the aforementioned exchange state a manoeuvrability of the described rotation lock section is present in the installation groove. Only by means of the transfer of the clamping means into the exchange state, the rotation lock section gets into the installation groove.

BRIEF DESCRIPTION OF THE DRAWINGS

Further aspects and advantages of the invention arise from the claims as well as from the preferred embodiments which are subsequently explained by means of the figures. The figures show in:

FIG. 1a to 1d a first variant of the outer clamping means according to the invention, FIGS. 2a and 2b a second variant of an outer clamping means according to the invention, FIGS. 3a to 3c a first variant of an inner clamping means according to the invention, and FIGS. 4a and 4b a second variant of an inner clamping means according to the invention.

DETAILED DESCRIPTION OF THE EXEMPLARY EMBODIMENTS

Figure 1A:
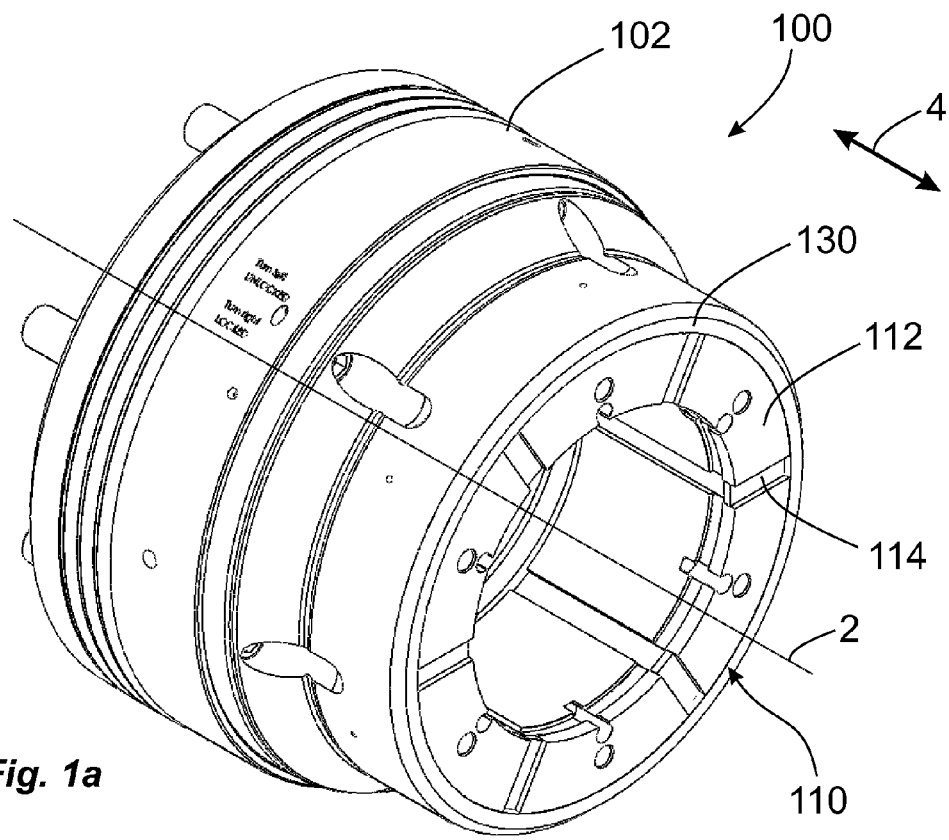

The figures show four variants of clamping means, having in common that they are provided for attaching to the spindle of a machine tool and for fixed clamping of a work piece for the purpose of the subsequent machining. During operation, the clamping means 100, 200, 300, 400 rotate together with the work piece clamped thereby around a rotational axis 2. They are attached to said spindle of the machine tool at their proximal end in each case shown on the left side in the illustrations. On the distal end shown on the right side in the figures, they comprise in each case a clamping segment ring 110, 210, 310, 410 which is provided for the immediate contact to the work piece to be processed, and which is composed in each case of a multitude of clamping segments 112, 212, 312, 412 as well as interposed elastically deformable intermediate sections 114, 214, 314, 414. For the purpose of clamping, the clamping segments 112, 212, 312, 412 can in each case be displaced in relation to the rotational axis 2 radially by means of the clamping means 100, 200, 300, 400.

Generally, the invention also relates to stationary, i.e. non-rotative, clamping means. The latter can be configured identically to the ones shown here. However, they can also have a configuration deviating therefrom and in particular due to imbalances or the like not suitable for rotative use.

In the case of the two outer clamping means 100, 200 a displacement of the clamping segments 112, 212 in the direction of the rotational axis 2 is effected for the purpose of clamping so that a work piece can be clamped from the outside. In the case of the inner clamping means 300, 400 clamping is effected by a radial movement of the clamping segments 312, 412 outwards so that a clamping is possible in the region of a hole of a work piece.

In the case of the outer clamping means 100, 200, there is in each case a relative displaceability present between the clamping segment ring 110, 210 on the one side and a clamping sleeve 130, 230 with respect to an axial direction 4 on the other side. In contrast, in the case of the inner clamping means 300, 400, a relative displaceability in the axial direction 4 is present between the clamping rings 310, 410 and a clamping mandrel 330, 430 surrounded by them.

In order to achieve a radial displaceability of the clamping segments 112, 212, 312, 412 by means of said in each case present relative manoeuvrability in the axial direction 4, the clamping sleeves 130, 230 and the clamping mandrels 330, 430 in each case comprise a guide surface 134, 234, 334, 434 oriented in the direction of the clamping segment ring 110, 210, 310, 410, which surface has an inclination with respect to the rotational axis 2. Corresponding to that, the sides of the clamping segments 112, 212, 312, 412 facing the clamping sleeves 130, 230 or the clamping mandrels 330, 430 are provided with inclined slide surfaces 116, 216, 316, 416. An axial relative displacement of the clamping segment rings 110, 210, 310, 410 in relation to the clamping sleeves 130, 230 or the clamping mandrels 330, 430 leads to the desired radial displacement of the clamping segments and thus to the desired clamping or de-clamping of the clamping means 100, 200, 300, 400 due to the sliding-off of the slide surfaces on the guide surfaces.

In all four embodiments, provision is made for that an actuation member 140, 240, 340, 440 which can be displaced in relation to the respective housing 102, 202, 302, 402 in axial direction 4 for achieving the desired relative displacement in axial direction 4, which member can be displaced in relation to the housing in axial direction 4 by means of the machine tool, in order to achieve the clamping and de-clamping of the clamping means.

With reference to the embodiment of FIG. 1a to 1d, it is provided that the clamping sleeve 130 remains fixed in location to the housing 102. Thus, for axial relative displacement of the clamping sleeve 130 and the clamping segment ring 110 in relation to one another, an axial displacement of the clamping segment ring 110 in relation to the housing 102 is required. To that end, at total of six bolt-type coupling elements 142 are screwed to the actuation member 140 by means of screws 141, two of which are visible in the sectional view of FIG. 1b. Said bolt-type coupling elements 142 extend from the common actuation member 140 through coupling holes 132 in the clamping sleeve 130. On their distal ends, the coupling elements 142 comprise at first a tapered region 144a and successive thereto in the distal direction a widened region 144b. The widened region 144b extends over the tapered region 144a radially inwards and into tangentially extended grooves 120 of the clamping segments 112. As a result, it is possible to effect a conjoint axial displacement of the clamping segments 112 by means of displacement of the actuation member 140 together with the coupling elements 142.

In this case, a distinctive feature lies with the coupling region 136, in which the coupling element 140 is coupled to the segment ring 110 in a form-fit manner, being arranged in axial direction 4 between a distal guide surface region 134b and a proximal guide surface region 134a. This allows to dispense with a coupling facility of the clamping segments provided at the proximal end of the same to the actuation member 140, and to thus achieve a smaller design size of the clamping means 100 in the axial direction 4. Furthermore, this also achieves that the coupling region 136 in which the coupling between the coupling elements 142 and the clamping segments 112 is effected, is largely protected against soiling. Since the slide surfaces 116 of the clamping segments 112 are at least almost planarly bearing against the guide surface 134 of the clamping sleeve 130, the coupling region 136 is effectively protected from dirt.

Figure 1B:
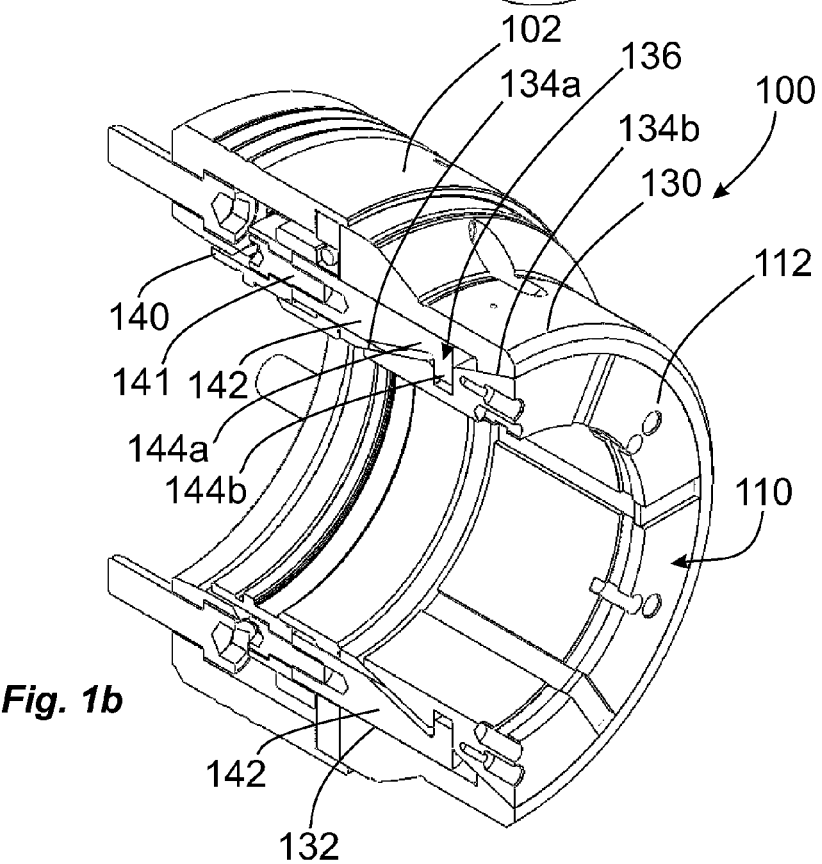

By means of the FIG. 1c, once again the structure of the clamping element 100 is illustrated. Here it can be seen that the guide surface 134 of the clamping means 130 is interrupted by the six coupling holes 132 extended in the axial direction 4, which holes receive the coupling elements 142 in a manner yet described above. With reference to FIG. 1b, it can easily be seen that the coupling elements 142 are guided in said holes 136 largely without clearance so that a tilting of the coupling elements 142 is effectively counteracted. Furthermore, FIG. 1c shows that in addition rotation lock bolts 138 are provided on the guide surface 134 of the clamping sleeve 130. During normal operation, said rotation lock bolts 138 extend into axial grooves 122 branched from the grooves 120 on the clamping segments 112. During operation, i.e., in the clamped and de-clamped state as well as when changing between clamped and de-clamped state, the rotation lock bolts 138 do not leave said respective axial grooves 122. Thus, it is effectively prevented that the clamping segment ring 110 twists in an undesired manner in relation to the clamping sleeve 130.

In order to nevertheless achieve a simple separability of the clamping segment ring 110 from the clamping sleeve 130, a displaceability of the actuation member 140 and of the coupling elements 142 in the distal direction is provided which exceeds the displaceability during the operation, i.e., when changing from the clamped state to the de-clamped state. For explaining the control thereof, reference is made to FIG. 1d. In particular, this figure shows the housing 102, the actuation member 140 as well as the coupling elements 142 attached thereto and extending axially. Additionally, a switch ring 160 is shown in said reduced exploded view, which can be turned around the rotational axis 2 by means of a screw 162. Said screw 162 can be accessed by means of a hole 103 on the housing 102. The switch ring 160 comprises cams 164 directed inwards. Corresponding to that, recesses 146 radially directed inwards are provided on the actuation member 140. This leads to the fact that depending on the rotational position of the switch ring 160, a decreased and an increased displaceability of the actuation member 140 with the coupling elements 142 in the distal direction is present. During normal operation, i.e., in the clamped or de-clamped state, or when changing between clamped and de-clamped state, the recesses 146 and the cams 164 are offset to one another in the circumferential direction, so that the relative manoeuvrability of the actuation member 140 and of the coupling elements 142 in relation to the housing 102 is reduced.

However, for the purpose of installation/de-installation, the switch ring 160 can also be brought into a rotated position which allows an increased relative manoeuvrability. When in the case of said increased relative manoeuvrability, the actuation member 140 and the coupling elements 142 are moved up to their distal end position, thereby the rotation lock bolts 138 get out of the axial groove 122 into the tangential groove 120. As soon as this is the case, the preconditions for a manual de-installation of the clamping segment ring 110 are given. Starting from this position, a rotation movement of the clamping segment ring 110 by approximately 30° is effected for the purpose of de-installation, up to the point when the end 144b of the coupling elements 142 in each case in the circumferential direction is arranged in the region of an intermediate section 114 between the clamping segments 112 and the rotation lock bolts 138 are in each case arranged in the region of a removal recess 124. Upon reaching said state, the clamping segment ring can be removed in the axial direction. The installation procedure is effected in reverse order. Likewise, at first the switch ring 160 is displaced such that an increased manoeuvrability is present between the actuation member 140 and the coupling elements 142 on the one side and the clamping sleeve 130 on the other side. Then, the clamping segment ring 110 is introduced axially and turned about ca. 30°. Finally, the switch ring 160 is brought again into that rotated position in which it limits the relative movement, after prior to that, the clamping member 140 was displaced in axial direction 4 in the direction of the proximal end of the clamping means. For explanatory purposes, the path of a rotation lock bolt 138 is shown by means of a dotted line in FIG. 1c during insertion/removal of the clamping segment ring 110.

The switch ring 160 represents but one exemplary option for changing the relative manoeuvrability. Also other means which limit the relative manoeuvrability can be used instead. In the simplest case, a limitation of the manoeuvrability could also be achieved by means of a screw which can be screwed-in radially.

Figure 2A:
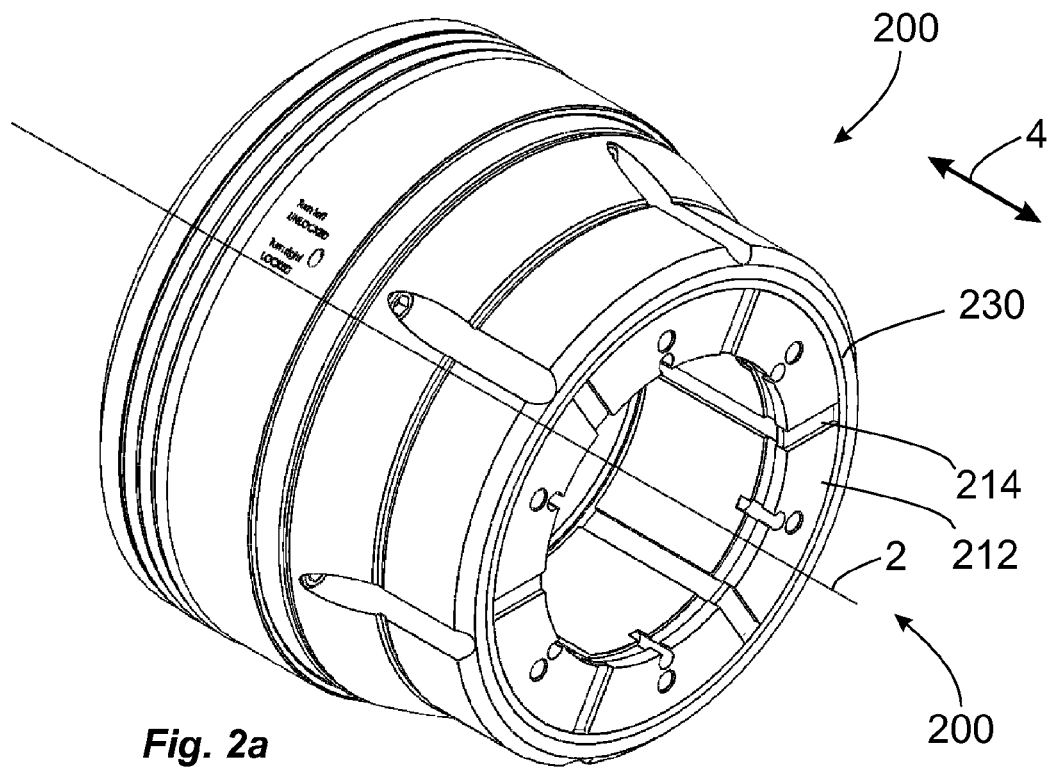
Figure 2B:
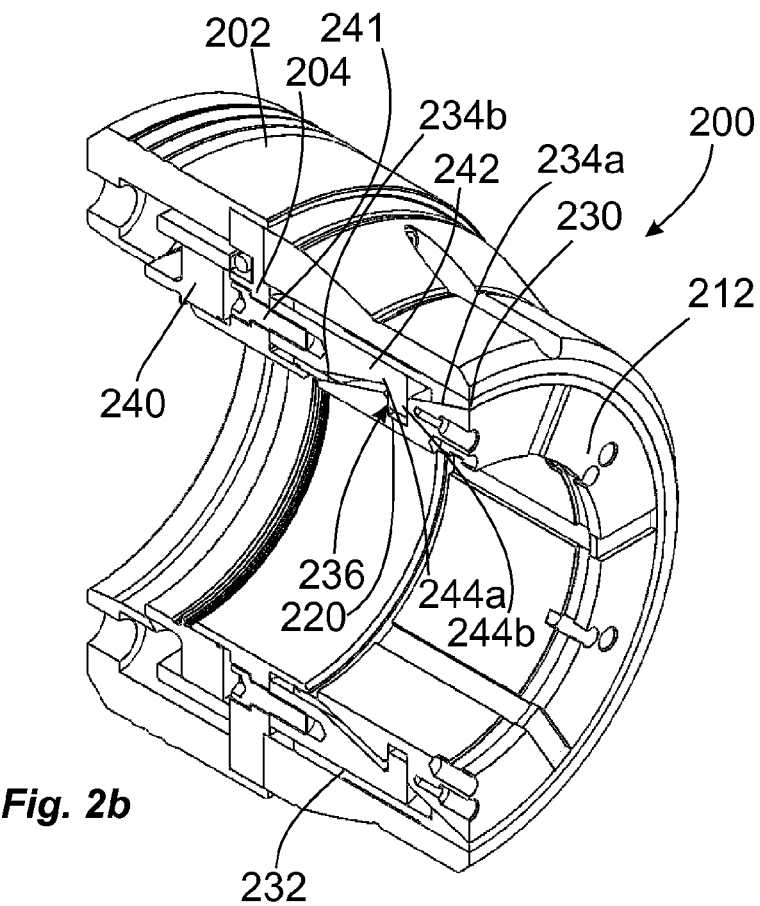

As already mentioned, the clamping means 200 of FIG. 2a and FIG. 2b is also an outer clamping means. The significant difference to the configuration of FIG. 1a to 1d lies with an axial manoeuvrability of the coupling elements 240 and thus of the clamping segments 212 in relation to the housing 202 not being present. The coupling elements 242 are connected to a ring plate 204 associated with the housing in a fixed manner by means of screws 241. In order to nevertheless achieve the radial manoeuvrability of the clamping segments 212, the clamping sleeve 230 can instead be displaced in relation to the housing 202 in axial direction 4. To that end, the clamping sleeve is connected to the actuation member 240 in a fixed manner and is moved axially together with the latter. Said connection of the clamping sleeve 230 to the actuation member 240 is effected by connection links not shown in the figures, which penetrate the ring plate 204.

The advantage of said configuration having axially fixed in location clamping segments 212 is in that clamping of a work piece does not involve an axial displacement of said work piece.

For the rest, the type of separation, not shown in further details, of the clamping segment ring 210 from the rest of the clamping means 200 is provided in the same way as in the embodiment of FIG. 1a to 1d, i.e., having a bayonet-type system.

Figure 3A:
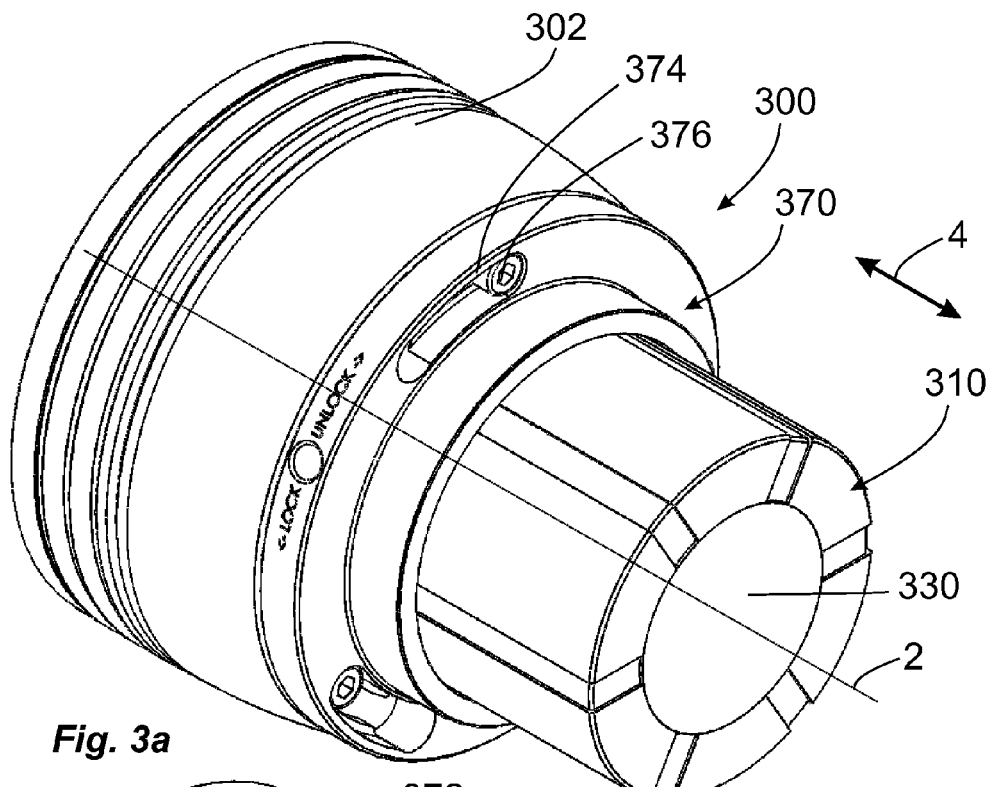
Figure 3B:
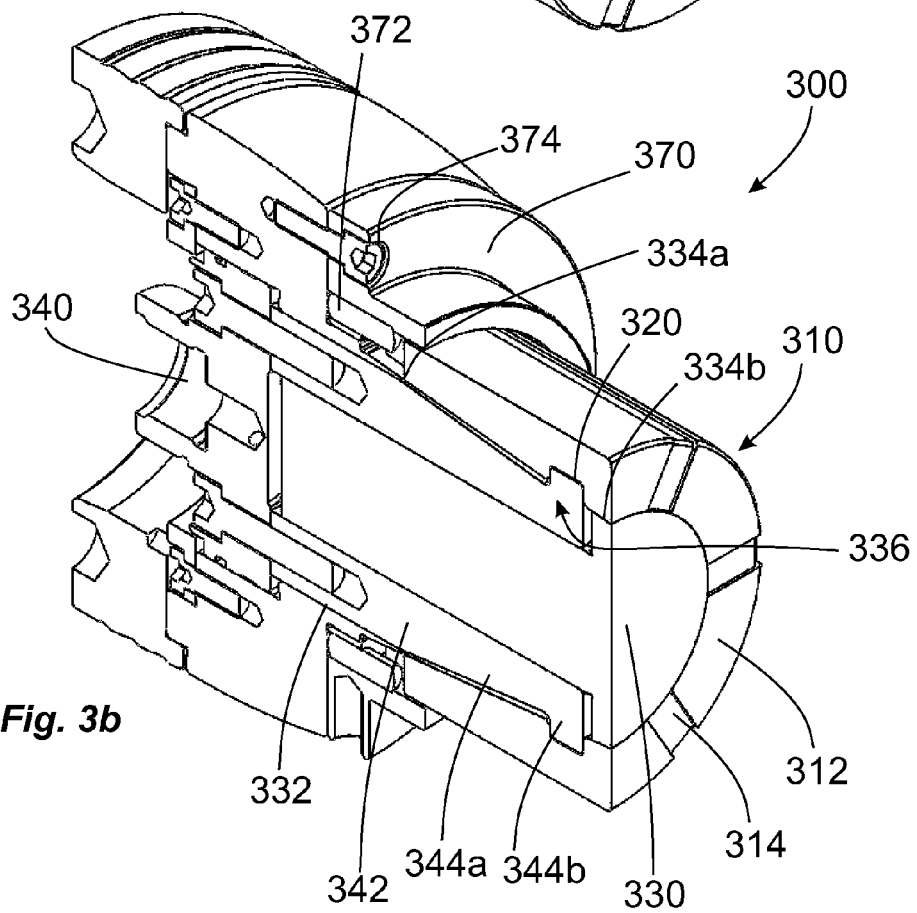

The embodiment of the FIGS. 3a to 3c differs from the preceding two embodiments in the manner described above in particular in that this is an inner clamping means. Instead of the clamping sleeve 130, a conical clamping mandrel 330 is provided, as can in particular well be seen from FIG. 3c. In said conical clamping mandrel 330, coupling channels 332 are provided for each of the six clamping segments 312, which extend in axial direction 4 and through which in each case one coupling element 342 attached to a common actuation member 340 extends. In a similar manner as in the preceding embodiments, said coupling elements 342 are configured at their distal ends 344b to extend with form-fit into inwards-facing tangential grooves 320 of the clamping segments 312 in order to thereby achieve the form-fit connection required for the axial relative movement. Unlike the preceding configurations, the desired rotation lock is achieved. For the purpose of achieving said rotation lock, a handling ring and securing ring 370 is provided, which is connected to the clamping segment ring 310 in a co-rotational manner by means of locking pins 372. Furthermore, on said handling ring and securing ring 370, slot holes 374 extended in the circumferential direction are provided, which allow a screwing of the handling ring and securing ring 370 to the housing. For the purpose of installation, the unit consisting of the clamping segment ring 310 and the handling ring and securing ring 370 is pushed axially onto the clamping cone 330 in a position rotated about 30° in relation to the use position. The ends 344b of the coupling elements 342 can thus engage in the region of the intermediate segments 314 of the clamping ring 310 up to the height of the tangential grooves 320 in the clamping segment ring 310. Subsequently, the entire unit consisting of the handling ring and securing ring 370 as well as the clamping segment ring 310 is rotated about 30°. Thereby, the ends 344b of the coupling elements 342 engage the tangential grooves 320. In this state, securing screws 376 penetrating the slot holes 374 are tightened so that the desired rotation lock in relation to the housing 302 is obtained.

As with the two outer clamping means 100, 200, also in the case of this inner clamping means 300 the form-fit coupling of the clamping segments 312 to the coupling elements 342 is in a coupling region 336 between a proximal guide surface region 334a and a distal guide surface region 334b.

Figure 4A:
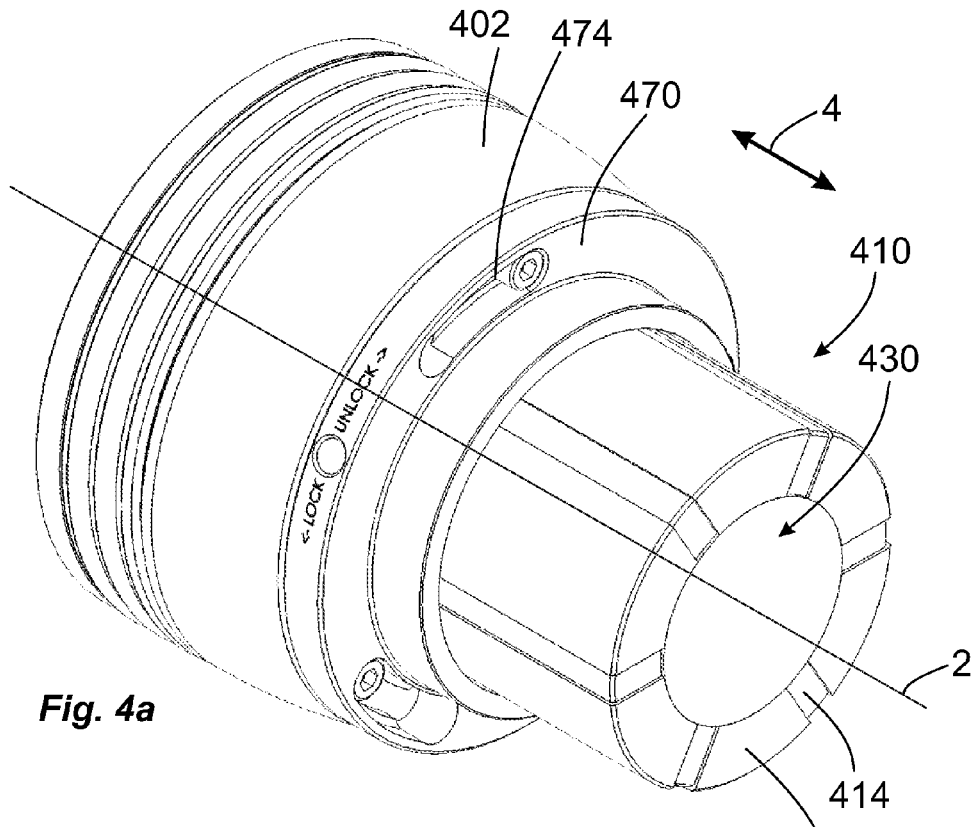
Figure 4B:
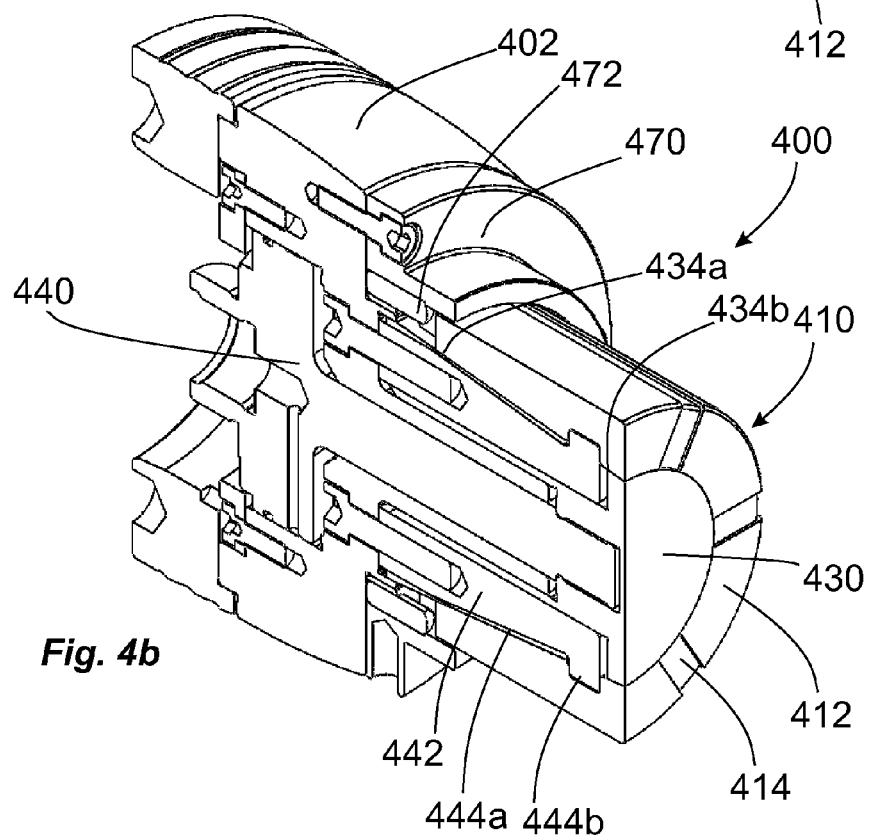

The embodiment of FIG. 4 is an inner clamping means as is the embodiment shown in FIG. 3. Just as with the embodiment of FIG. 2, this is a clamping means which comprises clamping segments 412 which cannot be moved axially in relation to the housing 402. Also in the embodiment of the FIGS. 4a and 4b, this is achieved in that the coupling elements 442 are screwed to the housing 402 fixed in location in relation to the axial direction 4. In relation thereto, the clamping mandrel 430 per se can be moved, which to that end is connected to the actuation member 440 in a form-fit manner. The ways and means of the handling of the clamping segment ring 410 and of the securing ring and handling ring 470 is not different from the one of the embodiment of FIGS. 3a to 3c.

The invention claimed is:

1. A clamping means in the type of an outer clamping means for fixing of work pieces, in particular for the purpose of rotating processing, having:
   a housing extending in an axial direction,
   an actuation member movable in the axial direction in relation to the housing for the purpose of clamping and de-clamping,
   a clamping sleeve, and
   a plurality of clamping segments which are arranged inside the clamping sleeve for applying force to the work piece,
   wherein:
   the clamping sleeve comprises at its inner side a guide surface for each clamping segment, the guide surface inclined in relation to the axial direction,
   the clamping segments in each case comprise on their outer side a slide surface inclined in relation to the axial direction,
   the clamping sleeve and the entirety of the clamping segments can be relatively displaced to one another in the axial direction, in order to achieve a radial displacement of the clamping segments in the case of axial relative displacement, and
   the clamping sleeve is axially attached fixed in location to the housing and the clamping segments are axially attached fixed in location to the actuation member, or the clamping sleeve is axially attached fixed in location to the actuation member and the clamping segments are axially attached fixed in location to the housing or the clamping sleeve and the clamping segments are coupled to the actuation member such that they can be displaced axially in opposing directions in relation to the housing by means of the actuation member,
   wherein for axial fixed in location coupling of the clamping segments to the housing or to the actuation member at least one coupling element is provided, which is provided axially fixed in location to the housing or to the actuation member and which is engaged axially in a form-fit manner with at least one clamping segment in a coupling region between a guide surface region of the guide surface distal in the axial direction and a guide surface region of the guide surface proximal in the axial direction,
   wherein the inclined surface of the clamping segments is in surface contact with the inclined proximal guide surface region and with the inclined distal guide surface region; and
   wherein the entirety of the clamping segments is adapted to the clamping sleeve such that an installation of the clamping segments to the clamping means is possible via a bayonet connection.

2. The clamping means according to claim 1, wherein the clamping segments form a firmly fitted clamping segment ring in which the individual clamping segments are interconnected by means of tangentially extendable intermediate segments.

3. The claiming means according to claim 2, wherein the clamping segment ring comprises three to eight claiming segments.

4. The clamping means according to claim 1, wherein in the clamping sleeve at least one coupling channel closed over its circumference is provided, through which the coupling element is guided from the housing or the actuation member up to the coupling region.

5. The clamping means according to claim 4, wherein a shaft of the coupling element and the coupling channel are adapted to one another such that the clearance transverse to the axial direction does not surpass 1 mm.

6. The clamping means according to claim 4, wherein the coupling element comprises at its distal end a necking and a widening successive thereto for achieving a form-fit connection.

7. The clamping means according to claim 6, wherein a cross-section of the coupling element does not exceed the free cross-section of the coupling channel in the region of the widening.

8. The clamping means according to claim 1, wherein one coupling element is provided for each clamping segment.

9. The clamping means according to claim 1, wherein to the entirety of the clamping segments a common, circumferential handling ring is assigned, to which the clamping segments are connected in a co-rotational manner.

10. The clamping means according to claim 1, wherein on the slide surfaces of the clamping segments, an installation groove is provided and extended in the circumferential direction.

11. The clamping means according to claim 10, wherein the installation groove ends in an intermediate area between two adjacent clamping segments.

12. The clamping means according to claim 10, wherein the clamping means can be switched between an operational state and an exchange state, wherein the relative manoeuvrability of the actuation member and of the housing in the exchange state is greater than in the operational state.

13. The clamping means according to claim 12, wherein the relative manoeuvrability in the operational state is limited such that the rotation lock section in the operational state is always arranged in the axial groove, and in the exchange state is increased such that the rotation lock section can engage up to the installation groove.

14. The clamping means according to claim 1, wherein on the guide surface of the clamping sleeve a rotation lock section is provided which extends in an axial groove extending in axial direction on the slide surface of the clamping segment.

15. The clamping means according to claim 1, wherein the internal guide surface of the clamping sleeve or of the clamping mandrel comprises a cone section shape tapering in the proximal direction or in the distal direction, or a negative pyramid shape tapering in the proximal direction.

* * * * *